United States Patent [19]

Few

[11] Patent Number: 5,915,499
[45] Date of Patent: Jun. 29, 1999

[54] APPARATUS FOR CHANGING TRANSMISSION FLUID IN ACCORDANCE WITH A SELECTED CONDITION AND METHOD OF CHANGING USING SAME

[75] Inventor: Jeffrey P. Few, Elkhart, Ind.

[73] Assignee: Flo-Dynamics, Inc., Compton, Calif.

[21] Appl. No.: 08/858,438

[22] Filed: May 19, 1997

Related U.S. Application Data

[63] Continuation-in-part of application No. 08/544,644, Oct. 18, 1995, Pat. No. 5,743,357.
[51] Int. Cl.$^6$ ........................................................ F16C 3/14
[52] U.S. Cl. .............................................. 184/1.5; 141/98
[58] Field of Search ................................ 184/1.5; 141/98

[56] References Cited

U.S. PATENT DOCUMENTS

| | | |
|---|---|---|
| 1,655,939 | 1/1928 | Copeland . |
| 1,815,221 | 6/1931 | Sweetland . |
| 1,829,173 | 10/1931 | Wertz . |
| 1,884,820 | 10/1932 | Osborne . |
| 2,320,048 | 5/1943 | Parson . |
| 2,369,857 | 2/1945 | Russell et al. . |
| 2,499,705 | 3/1950 | Vokes . |
| 3,140,756 | 7/1964 | Dinklekamp . |
| 3,216,527 | 11/1965 | Lewis . |
| 3,447,636 | 6/1969 | Bonfilio . |
| 3,513,941 | 5/1970 | Becnel . |
| 3,720,287 | 3/1973 | Martel . |
| 3,867,999 | 2/1975 | Cox . |
| 3,964,511 | 6/1976 | Cattermole . |
| 4,095,672 | 6/1978 | Senese . |
| 4,095,673 | 6/1978 | Takeuchi . |
| 4,114,644 | 9/1978 | Piper . |
| 4,128,140 | 12/1978 | Riches . |
| 4,331,185 | 5/1982 | Rinaldo et al. . |
| 4,390,760 | 6/1983 | Schwitters .............................. 200/61.04 |
| 4,551,984 | 11/1985 | Vogel et al. . |
| 4,674,456 | 6/1987 | Merritt . |
| 4,745,989 | 5/1988 | DiMatteo . |
| 4,807,674 | 2/1989 | Sweet . |
| 4,869,346 | 9/1989 | Nelson . |
| 4,938,315 | 7/1990 | Ohta et al. . |
| 4,951,784 | 8/1990 | Bedi . |
| 4,958,666 | 9/1990 | Kocourek et al. . |
| 4,976,235 | 12/1990 | Commanday . |
| 4,998,437 | 3/1991 | Magoolaghan . |
| 5,005,615 | 4/1991 | McGarvey et al. . |

(List continued on next page.)

FOREIGN PATENT DOCUMENTS

| | | |
|---|---|---|
| 2-72299 | 3/1990 | Japan . |
| 4-15354 | 4/1992 | Japan . |

OTHER PUBLICATIONS

Appears to be document intended to promote Orbis ATF Chang.
Appears to be document relating to Tatsuno ATF Changer.
Apperas to be documents from Yamada Corporation relting to various apparatus and what purports to be English translation thereof.
Publication, Oct., 1997, *Instrumentation & Automation News*, relating to Oil Quality Sensor.
Two advertisements on Yamada ATF Changers.
Engine Solutions, Inc. Brochure.
Wolf's Head ATF Changer Advertisement.
Grease Monkey Fluid Exchanging Procedure.
Power Clean 2000 Advertisement.
Copy of brochure on ICC Federated Oilcheck.
Catalog Page on Signet Scientific Company Analystical pH/ORP Controllers and Instrument Sensors.

*Primary Examiner*—Thomas E. Denion
*Attorney, Agent, or Firm*—Fulwider Patton Lee & Utecht, LLP

[57] ABSTRACT

Method and apparatus for changing transmission fluid by draining out used fluid and pouring in fresh fluid until the electrical conductivity of the outflowing fluid is substantially equal to the electrical conductivity of the inflowing fresh fluid.

11 Claims, 3 Drawing Sheets

U.S. PATENT DOCUMENTS

| | | |
|---|---|---|
| 5,051,921 | 9/1991 | Paglione . |
| 5,056,621 | 10/1991 | Trevino . |
| 5,062,398 | 11/1991 | Bedi et al. . |
| 5,062,500 | 11/1991 | Miller et al. . |
| 5,090,458 | 2/1992 | Creeron . |
| 5,091,078 | 2/1992 | Ogawa . |
| 5,092,429 | 3/1992 | Linares et al. . |
| 5,097,703 | 3/1992 | Peter . |
| 5,148,785 | 9/1992 | Sendak . |
| 5,205,172 | 4/1993 | Doak . |
| 5,289,837 | 3/1994 | Betancourt . |
| 5,291,968 | 3/1994 | Brown . |
| 5,318,080 | 6/1994 | Viken . |
| 5,318,700 | 6/1994 | Dixon et al. . |
| 5,337,708 | 8/1994 | Chen . |
| 5,370,160 | 12/1994 | Parker . |
| 5,372,219 | 12/1994 | Peralta . |
| 5,390,762 | 2/1995 | Nelson . |
| 5,415,247 | 5/1995 | Knorr . |
| 5,427,202 | 6/1995 | Behring et al. . |
| 5,429,159 | 7/1995 | Tees et al. . |
| 5,437,184 | 8/1995 | Shillady . |
| 5,447,184 | 9/1995 | Betancourt . |
| 5,450,744 | 9/1995 | Martyn ................................ 73/61.71 |
| 5,472,064 | 12/1995 | Viken . |
| 5,507,178 | 4/1996 | Damn . |
| 5,522,474 | 6/1996 | Burman . |
| 5,530,529 | 6/1996 | Henderson et al. .................... 355/246 |
| 5,535,849 | 7/1996 | Few . |
| 5,567,246 | 10/1996 | Bowden ................................ 134/25.4 |

APPARATUS FOR CHANGING TRANSMISSION FLUID IN ACCORDANCE WITH A SELECTED CONDITION AND METHOD OF CHANGING USING SAME

This is a continuation-in-part of application Ser. No. 08/544,644 filed on Oct. 18, 1995 now U.S. Pat. No. 5,743,357.

BACKGROUND OF THE INVENTION

1. Field of the Invention

The present invention relates to devices for changing transmission fluid, and more particularly to devices that compare a condition of used fluid being removed with the condition of fresh fluid being added to determine when the used fluid in a transmission has been substantially replaced by fresh fluid.

2. Description of the Prior Art

Automatic transmissions require transmission fluid because such fluid is employed in part as a driving means within the transmission and is additionally employed to lubricate the internal components within such transmissions. Over time such fluid becomes less viscous and thus less efficient in lubricating such components. Additionally, the fluid tends to pick up contamination in the form of metal particles and the like, thus exposing the transmission to accelerated wear. It is therefore desirable to periodically exchange the used fluid with new fluid to maintain the viscosity of such fluid within the transmission and to maintain the cleanliness of the transmission to thereby increase the useful life of the transmission. A substantially complete exchange of fluid is preferred so that the used fluid as well as undesirable foreign matter contained therein is completely removed from the transmission and is replaced with new, more viscous fluid.

There has been a long standing need for a device which may efficiently perform a substantially complete exchange of transmission fluid in an automatic transmission while at the same time posing minimum risk of damage to the transmission. The conventional method, still widely practiced today, is to simply replace the fluid housed in the pan of the transmission. The pan typically holds from 1 to 5 quarts of the total 7 to 15 quart capacity of the transmission. Thus emptying the pan and then adding that amount of new fluid only serves to dilute the used fluid with some 15–25% of new fluid. Hence this conventional service is quite inefficient since it only serves to mix new fluid with a large quantity of used fluid. Furthermore, this service requires the removal of the transmission fluid pan from the transmission for emptying of the fluid therefrom and replacement of the pan on the transmission housing. This can prove to be a messy and time consuming process. In addition, the pan is often not replaced squarely over the pan seal or, on occasion, will trap small foreign particles in the seal area resulting in leakage.

More recently, there have been efforts to make a complete exchange of all the fluid in an automobile's transmission by disconnecting a fluid tube and draining the fluid into a waste oil dump while manually pouring new fluid into the transmission dipstick tube. This procedure has proven to be inefficient, inadequate and so time consuming that it has failed to gain broad acceptance.

Another method proposed involves disconnecting a transmission fluid cooler line to allow one disconnected end to drain freely, while the other end is connected to a relatively large pressurized bulk storage tank to inject unused fluid into the cooler line to refill the transmission. This procedure can be quite untidy and has proven to be generally unsatisfactory.

Yet another device proposed in an attempt to facilitate fluid removal and replacement in an automobile fluid system includes a switching control device permanently mounted to an engine oil system. A device of this type is described in U.S. Pat. No. 5,056,621 to Trevino. This device includes a pump to be mounted to the engine block and a pair of input suction conduits for connection to, respectively, an oil drain port and to a source of unused oil. The device includes a switch which allows for the selection of the conduit through which fluid will be drawn and a pump to draw fluid through the selected conduit. An output conduit is also provided with a free distal end for releasable connection to a waste oil tank when the switch is in the position to flow fluid from the oil drain port, and for releasable connection to an oil filler tube when the switch is placed in the position to allow fluid to flow from the source of unused fluid. Devices of this type have not gained acceptance for changing transmission fluid in that they are burdensome to use and time consuming because, in order to switch such a device between withdrawing and replacing fluid, the operator must manually remove the output conduit from the waste oil tank and connect such conduit to the vehicle's oil filler tube.

Other work in this field has led to the proposal of a transmission fluid changer including air pressurized tanks for the delivery and extraction of transmission fluid via the transmission cooler lines. A device of this type is shown in U.S. Pat. No. 5,318,080 to Viken. Such devices are rather cumbersome and make no provision for electronically sensing the condition of the fluid being evaluated to determined when the condition of the fluid in the transmission reaches an acceptable level of cleanliness.

Further efforts have led to a portable device which may perform a simultaneous, substantially complete exchange of transmission fluid. Such a device is shown in U.S. Pat. No. 5,370,160 issued to Parker and assigned to the assignee of the instant application. Such a device may be utilized to adjust flow rates of the fluids being withdrawn from or introduced to the transmission. While having gained general commercial acceptance, this device suffers the shortcoming that the operator must rely on either a count of the volume of fluid exchanged or color of fluid being evaluated to indicate when the exchange is substantially complete. Still further efforts have led to the development of a device touted as a portable shown in U.S. Pat. No. 5,337,708 to Chen. The operator of this device is also left with no reliable way of knowing when the exchange of fluid is substantially complete.

The devices described previously all suffer from the common shortcoming that they measure the amount of fluid drained out, or alternatively rely on the operator's subjective comparison of the color of fresh fluid with that of the drained fluid, to indicate when the exchange of used fluid is complete. As described previously, the configuration of most transmissions is such that only a percentage of the fluid can be typically drained out and neither of these two methods is therefore sufficiently accurate to ensure that a satisfactory percentage of the used fluid has been removed. Comparing colors is a highly subjective call, and even an experienced mechanic can be quite inaccurate when the color of the fresh fluid is so dark that even heavily contaminated fluid appears only slightly darker. Comparing the amount of fluid removed with the total amount of fluid the transmission is known to hold is also no guarantee that some of the fluid removed is not just freshly added fluid. Neither method can thus give a reasonably accurate indication of how much of the used fluid has actually been replaced and how much still remains within the transmission.

It has been recognized that small samples of fluid may be taken and dripped into a tiny disk to be sensed by a dielectric sensor to determine the degree to which the fluid so dripped has been contaminated. Such a device has been marketed under the trade designation OilCheck by ICC Federated. However, such an approach has not been generally accepted in the field for detecting the progress made in the exchange of transmission fluid and is generally too untidy and time consuming to employ in the practical applications.

As such, it may be appreciated that there continues to be a need for an automatic transmission fluid exchanging device that will detect and measure the level of contamination in fluid drained from a transmission and thereby enable the operator to know with reasonable accuracy when a certain percentage of the total fluid within the transmission has been replaced. Further, it would be helpful if this capability were employed in a system providing for a continuous and simultaneous exchange of fluid and where the exchange is automatically discontinued upon the fluid in the transmission reaching a predetermined level of renewal. The instant invention addresses this need.

SUMMARY OF THE INVENTION

The present invention provides a method for replacing used fluid in an automatic transmission with fresh fluid by pumping the fresh fluid into the transmission and draining the used fluid out of the transmission. The electrical conductivity of the fresh fluid and the drained fluid is continuously monitored and the two readings compared until the difference between the two readings reaches a selected value, at which time the pumping and draining operations cease.

A device according to the present invention preferably includes an inlet conduit for pumping fresh fluid into the transmission and an outlet conduit for draining used fluid out of the transmission. An electrical conductivity sensor is mounted within each conduit for monitoring the electrical conductivity of the flowing fluid, and a controller is electrically coupled to both sensors to compare and display the readings provided by the sensors. When the difference between the two conductivity readings is equal to a selected value the controller generates an electrical signal to alert the operator that the fluid exchange process is complete.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENT

Automobile automatic transmissions require regular exchange of the used fluid with fresh fluid because over time the fluid becomes contaminated and less viscous and thus less efficient in lubricating the internal components of the transmission. It is preferred that a relatively complete exchange of the fluid be effectuated so that the used fluid as well as undesirable foreign matter contained therein is substantially removed from the transmission and replaced with new, more viscous, contaminant free fluid. Currently known and used methods for replacing used transmission fluid are generally time consuming, prone to accidental spills, incomplete, and inaccurate.

Figure 1:
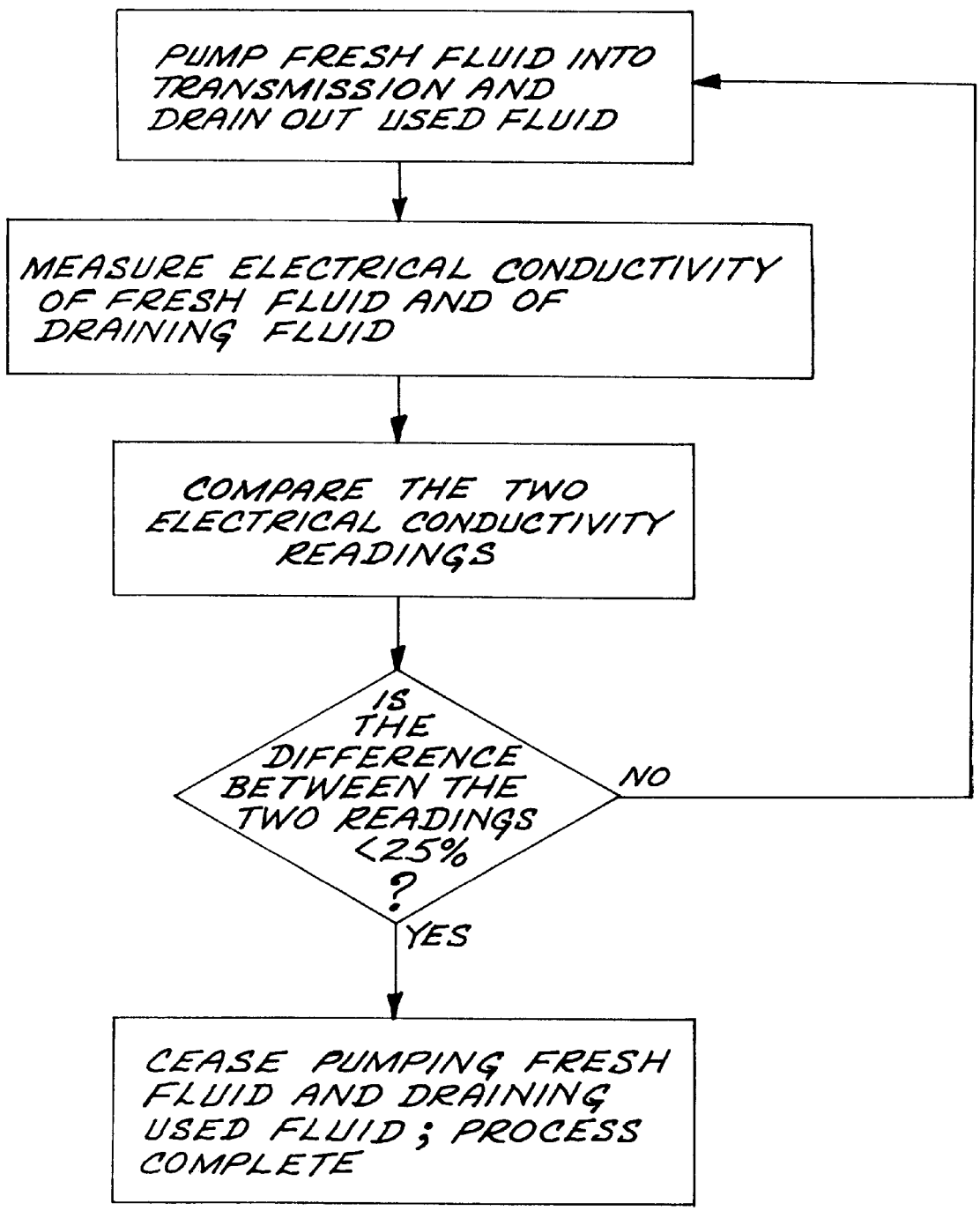
FIG. 1 is a flow diagram of the method of the present invention.

The present invention addresses the major shortcomings of conventional transmission fluid replacement methods by directly measuring the contamination level in the fluid drained out of a transmission to determine when a selected percentage of the used fluid inside the transmission has been replaced by fresh fluid. As shown in FIG. 1, the exchange process of the present invention generally entails pumping fresh fluid into the transmission while draining out the used fluid, and measuring the contamination level of the draining fluid as contrasted to the fresh fluid. Once the contamination level of the draining fluid reaches a predetermined value, the process is complete and the pumping and draining operations cease.

Assessing the contamination level of the drained fluid is achieved by measuring its electrical conductivity and comparing it with the electrical conductivity of the inflowing fresh fluid. The electrical conductivity of a material is a measure of the electric current flowing through the material when a given voltage difference is applied across the material. It is a well known physical phenomenon that as the level of conductive contaminants such as metals in a fluid increases, the electrical conductivity increases as well. Hence, by measuring the conductivity level of fresh fluid, which is assumed to be contaminant free, a baseline reading is established against which the fluid being drained out of the transmission can be compared. By comparing the current level of contamination in the draining fluid against the initial reading, when the draining fluid was composed exclusively of used fluid, the technician employing the present invention will know at any given moment how much of the fluid inside the transmission has been replaced by fresh fluid. Thus, for instance, if the difference between the electrical conductivity of the draining fluid and the fresh fluid has fallen by half, the technician will know that approximately half of the used fluid in the transmission has been replaced.

Figure 2:
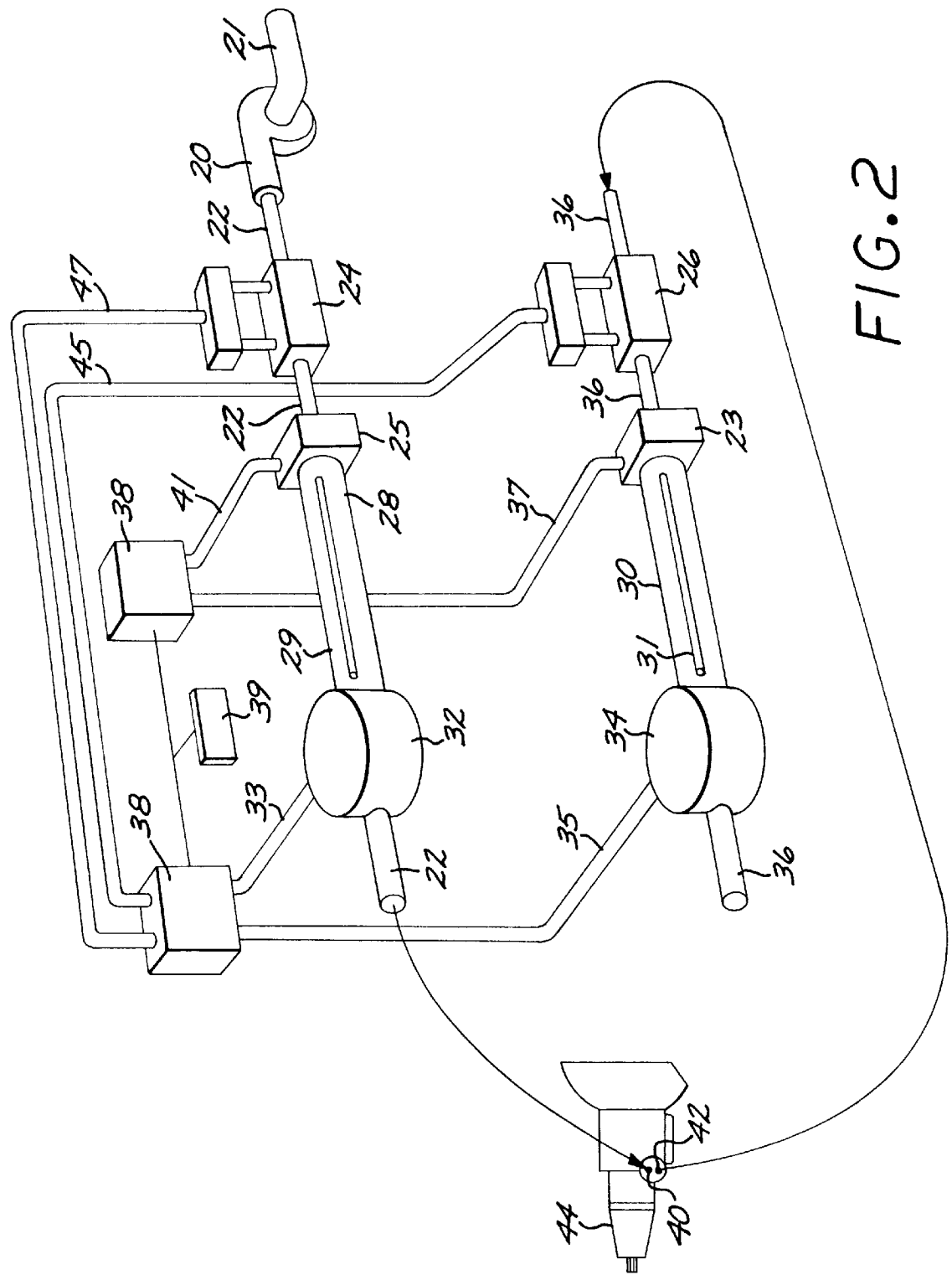
FIG. 2 depicts a schematic diagram of an apparatus for carrying out the method shown in FIG. 1.

With reference now to FIG. 2, the apparatus of the present invention includes a pump 20 having an inlet conduit 21 connected with, for instance, a bulk supply of fresh transmission fluid, and an outlet conduit 22. The pump 20 is preferably electric-motor driven, and should have a rating of about 4 to 8 gallons per minute at a head of 20 feet. Electric pumps are convenient to operate, quiet, and typically smaller than other types of pumps, and are therefore well suited to use in an automotive shop where there are usually numerous electric power outlets. The inlet conduit 21 should be flexible to permit easy mounting within a small space such as on a wheeled cart, and should be made from a corrosion resistant material such as synthetic rubber.

A pair of transmission inlet and outlet flow control valves 24 and 26 are connected with the pump outlet conduit 22 and with a transmission outlet conduit 36, respectively. The valves 24 and 26 are responsive to the magnitude of respective electric signals to progressively adjust their respective flow apertures anywhere from fully closed to fully open proportionate to the magnitude of the signal received. Transmission inlet and outlet flow tubes 28 and 30 are connected on their respective inlet ends with the respective valves 24 and 26 through fittings 23 and 25 and on their respective outlet ends with respective inlet and outlet flow meters 32 and 34. The respective flow tubes 28 and 30 are preferably constructed of plexiglass and include respective electrical conductivity detection probes 29 and 31. Such probes may be in the form of sensors Model 2822 available from the Signet Scientific Company, El Monte, Calif.

The flow meters 32 and 34 are electrically coupled through electric leads 33 and 35, and the conductivity probes 28 and 30 through electric leads 41 and 37, to a controller 38. The flow meters generate electric signals proportional to the rate of fluid flow passing through them, and the conductivity probes supply electric signals proportional to the electrical conductivity of the fluid flowing through them. The controller 38 is electrically coupled to the flow control valves 24 and 26 through electric leads 47 and 45 to generate control signals commensurate with the signals received from the flow meters to actuate the flow control valves. The controller should include a display 39 for displaying various messages and values, and includes a microprocessor chip that is programmable and can therefore be customized to perform different functions and generate a variety of outputs based upon various inputs. The controller microprocessor must include circuitry for comparing different signals to calculate and display the differential value between such signals. A controller suitable for this application is the Signet 9040 Intelek-Pro ORP Controller available from the Signet Scientific Company of El Monte, Calif. The controller 38 is shown in FIG. 2 as two FIG. 2 as two separate modules for clarity, but it will be understood that typically a single controller will provide all functions required by the present invention.

With continued reference to FIG. 2, when it is desirable to service a transmission 44, the operator may gain access to the transmission radiator coolant lines or to, for instance, an adaptor secured to the transmission fluid filter mount to establish an inlet 40 to the transmission and an outlet 42 downstream of the transmission pump. He or she may then connect the free end of the inlet conduit 22 to the inlet of the transmission and the free, or upstream end of the outlet conduit 36 to the outlet of the transmission. The transmission inlet 40 may be any suitable opening affording access to the transmission fluid, and can include the transmission dipstick funnel or the transmission fluid cooler lines. The downstream end of the outlet conduit 36 should be placed to drain in a waste oil tank or sump.

The operator will next start the automobile's engine to actuate the transmission pump, turn on the controller 38, and start the pump 20 which will commence to draw fresh transmission fluid from the reservoir and pump it through the inlet conduit 22, forcing it to flow sequentially through the inlet flow control valve 24, conductivity probe 28, flow meter 32, and then into the transmission inlet 40. At the same time, used transmission fluid will be pumped out of the transmission outlet 42 through the drainage conduit 36, passing through the outlet flow control valve 26, conductivity probe 31, and flow meter 34 before draining into the drainage tank. The fluid draining out of the transmission outlet 42 will initially consist exclusively of used fluid, but as fresh fluid is added the used fluid will begin to intermix with the fresh fluid, and the fluid draining out will eventually consist of a mixture of the two.

The controller 38 should be programmed to initially actuate the flow control valves 24 and 26 to fully open positions. As fluid starts to flow through the inlet and outlet conduits 22 and 36, the flow meters 32 and 34 will commence to provide electric signals through electric leads 33 and 35 to the controller 38 indicative of the rate of flow through the two conduits. The controller 38 should be programmed to then begin to actuate the two flow control valves 24 and 26 through electric leads 45 and 47 with control signals to maintain substantially equal rate of flow through both conduits 22 and 36. This is an extremely useful feature because it helps to ensure there is always a supply of fresh fluid to the transmission pump. Alternatively, the controller 38 could be programmed to sum the amount of fluid flowing into and draining out of the transmission, as indicated by the two flow meters 32 and 34, and at the end of the procedure to compare the two sums and indicate any difference to the operator upon the display 39. In this manner the operator would know whether too much or too little fluid was added as compared to the fluid removed, and would be able to take appropriate action by adding extra fresh fluid or draining excess fluid out.

Another method of controlling the flow of fluid in and out of the transmission entails coupling the pump 20 to the controller 38 and programming the controller to generate a control signal based on the differential between the two flow meter signals 33 and 35 to modulate the speed of the pump accordingly and maintain equal flow rates through the two conduits 22 and 36. This method does not require the use of flow control valves and thus a simpler controller with fewer outputs may be used, thereby lowering the cost and complexity of the equipment required.

As fluid starts to flow through the two conduits 22 and 36, the electrical conductivity probes 29 and 31 are activated and begin to generate electric signals proportional to the electrical conductivity of the fluid passing through them to be communicated through the leads 29 and 31 to the controller 38. The controller 38 displays these two readings upon the controller display 39 for the operator to track the level of contamination in the draining fluid. As the fresh fluid flows into the transmission 44, it begins to mix with and displace the used fluid out of the transmission, and eventually the contamination level of the fluid being drained out begins to decrease. The operator can track this decreasing level to ascertain how much of the used fluid has been replaced. Alternatively, the controller 38 may be provided with a button that will allow the operator to 'zero' the initial used fluid conductivity reading against the baseline fresh fluid reading and display the receding contamination level of the draining fluid in terms of percentage change from the initial reading.

In either mode, the panel display 39 will display the approximate percentage of used fluid that has been replaced within the transmission 44, and the operator will thus know with a relatively high degree of accuracy when the desired percentage has been reached and the fluid exchange process can be stopped. The controller 38 may also be programmed with the desired value for percentage of used fluid replaced to generate a warning signal to the operator that may be in the form of a warning message on the display 39, or that may actuate an indicator (e.g. a red light). Alternatively, the controller 38 may be electrically coupled to the pump 20 and the warning signal may shut down the pump automatically, and/or actuate the flow control valves 24 and 26 to shut off completely. Shutting off the flow control valves is preferred because doing so will prevent fluid from continuing to drain out of the transmission 44 after the inflow of fresh fluid has ceased.

The present invention may also be employed with just one conductivity sensor immersed in the draining fluid, whereby the controller can be programmed with a predetermined value for the baseline electrical conductivity of fresh fluid against which the conductivity reading of the draining fluid can be compared. This is a somewhat simpler method to implement because it does not require a second conductivity probe, but is also more limited in application because the baseline fresh fluid conductivity reading must be known for every type of transmission fluid that the operator may have to use.

Figure 3:
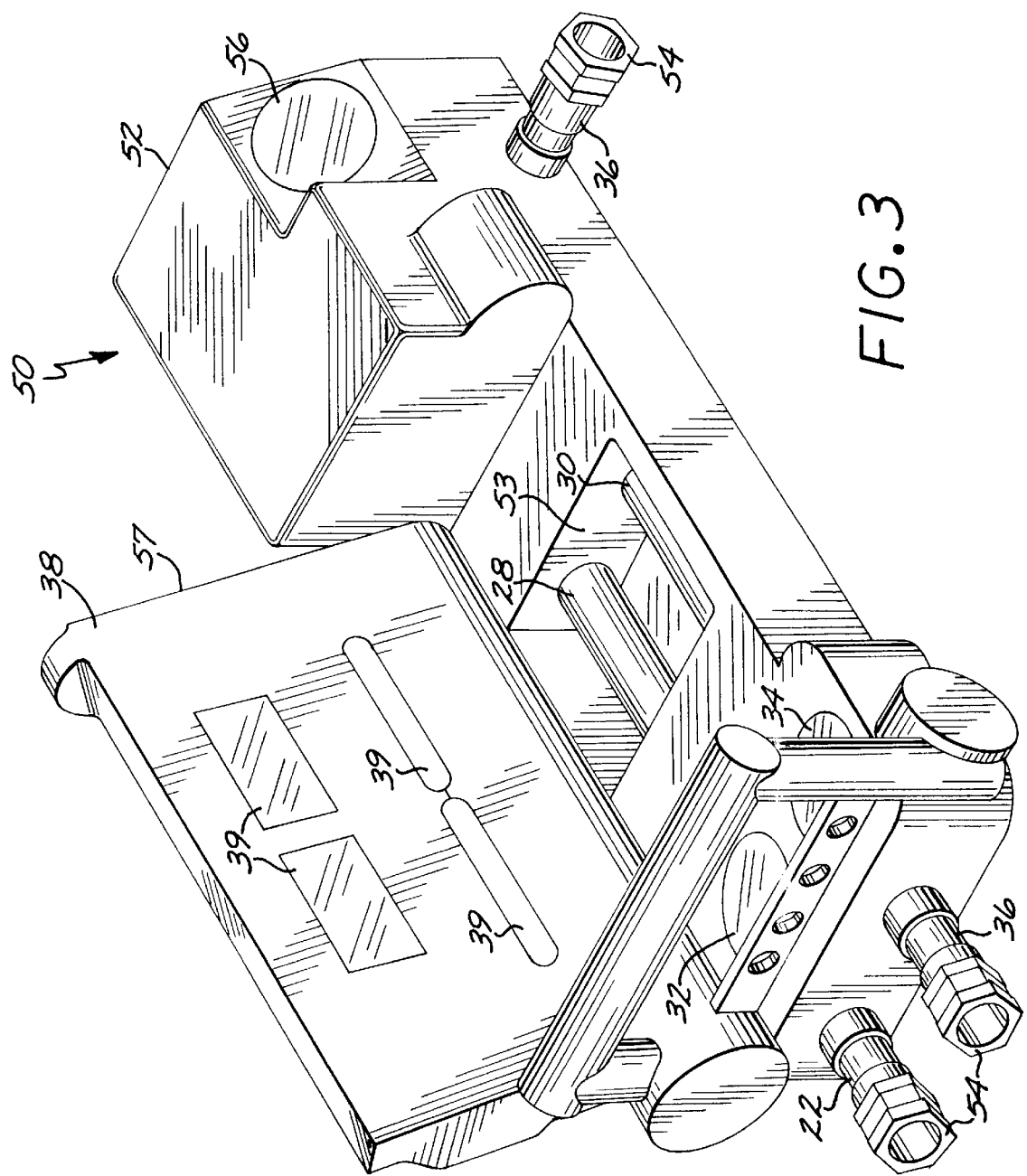
FIG. 3 shows a perspective view, in enlarged scale, of a hand held control unit which may be incorporated in the apparatus shown.

Referring now to FIG. 3, an exemplary embodiment of a device for changing automatic transmission fluid according to the present invention, referred to generally as 50, includes a hand held housing 52 containing a controller 38, an inlet conduit 22, and an outlet conduit 36. Mounted in line on each conduit is a flow control valve, a flow tube 28 and 30 containing a conductivity probe, and a flow meter 32 and 34.

The housing 52 is preferably constructed of a durable material that will withstand the rigors of every day use in an automotive shop and is relatively corrosion resistant, such as high-impact plastic or aluminum. The flow meters 32 and 34 and flow control valves are contained within the housing 52 and are thus shielded from environmental factors such as dust, liquids, and accidental impacts. The housing includes a handle 53 at one end for the operator to grasp during use, and a raised tower 58 at the other end with a view window 56 and containing the two flow control valves. The flow tubes 28 and 30 are formed with transparent walls and exposed within a recess 53 formed in the housing so that the operator can visually verify the flow of fluids as well as observe the color of the draining fluid and contrast it with the color of the fresh fluid.

The ends of the two conduits 22 and 36 are equipped with fittings 54 that extend out of the housing 52 for mounting hoses thereto. The controller is contained within a flat panel 57 that contains the controller unit and the controller display 39. The panel 57 is pivotally mounted to the top of the housing 52 so as to hinge closed over the flow tube recess 53 between the handle 53 and raised tower 58 for easy and safe transport and storage, and to hinge open at an angle for comfortable viewing of the display by the operator during use. The controller is electrically coupled to the flow meters 32 and 34 and the electrical conductivity probes 28 and 30 to receive signals indicative of the magnitude of the flow rate and the electrical conductivity, respectively, of the fluid flowing therethrough. The controller is also electrically coupled to the flow control valves to generate control signals corresponding to the flow rate signals received for actuating the valves.

In operation, the operator will attach a hose between the upstream end of the inlet conduit 22 and a pump, and connect the pump infeed to a source of fresh transmission fluid. The operator will then attach a hose between the downstream end of the inlet conduit 22 and the inlet of the transmission, another hose between the outlet of the transmission and the upstream end of the outlet conduit 36, and a third hose between the downstream end of the outlet conduit and a drainage tank or sump.

As previously described, the operator will next activate the pump and turn on the controller 38 to energize the flow meters to generate signals proportional to the rate of flow of fluid through the inlet and outlet conduits 22 and 36, as well as energize the two conductivity probes 28 and 30 to generate signals indicative of the electrical conductivity of the fresh and drained fluids flowing through the two conduits. The controller 38 will in turn generate control signals to regulate the flow control valves and thereby maintain equal fluid flow rates through the two conduits 22 and 36 to ensure that the amount of fluid added is equal to the amount of fluid removed from the transmission. Additionally, the controller display 39 will display numerical values for the conductivity readings provided by the two conductivity probes to enable the operator to ascertain when a particular percentage of the used fluid in the transmission has been replaced. As detailed in the specification, the controller 38 may also be programmed with a particular value for the differential between the two conductivity readings which will trigger the controller to generate a shut down signal to alert the operator and optionally to shut down the pump, close the flow control valves, or both. Additionally, the controller 38 may also be programmed to display the total amount of fluid added and removed and alert the operator to any discrepancy between the two values.

In an alternative application of the present invention, an electrical conductivity probe as described previously is mounted within an automobile's transmission so as to be immersed within the transmission fluid, such as in the transmission pan. An indicator responsive to a predetermined signal amplitude is next selected, coupled to the probe, and mounted on the dashboard of the automobile. The signal amplitude that will trigger a response from the indicator is derived experimentally for the particular type of transmission fluid used in the automobile as the value corresponding to a selected level of contamination. The probe and indicator are powered continuously while the automobile engine is running, and as the level of contamination in the transmission fluid increases the amplitude of the probe signal supplied to the indicator increase proportionately. When the level of contamination reaches the preselected value, the indicator is actuated by the probe signal and warns the driver of the automobile of the need to change the transmission fluid.

This method may be employed to continuously monitor the degradation of the transmission fluid in automobiles as well as other applications such as marine power plants and the like. The method is particularly advantageous for large, heavy duty engines such as diesel truck engines that typically run continuously anywhere from ten to over sixteen hours a day under heavy load conditions, and for which the degradation of the transmission fluid is particularly hard to gauge and predict. This method therefore greatly simplifies preventive maintenance and increases the useful life of automobiles with minimal impact upon their overall bulk and mechanical complexity.

From the foregoing, it will be appreciated that the present invention provides an effective method for accurately gauging what percentage of used fluid in a transmission has been replaced by fresh fluid at any time during an exchange procedure, thereby voiding the need for conventional, time consuming, messy procedures that typically involve removing the transmission pan. The method taught herein accomplishes this goal with relatively inexpensive, commonly available components that can be quickly and easily assembled by one of common skill in the art. The present invention therefore provides a valuable service by enabling a more complete and at the same time more cost effective procedure for exchanging used transmission fluid, therefore rendering the procedure more attractive to a wider range of automobile owners who would have otherwise avoided changing their automobile's transmission fluid due to high cost and/or inefficacy, and ultimately resulting in longer lasting, better running, less polluting automobiles. It is important to note that the method of the present invention can also be retrofitted to a number of conventional transmission fluid replacement methods and devices currently in use. The present invention can thus be used to improve upon existing equipment rather than replace it, thereby allowing automotive shops to offer improved service to their customers without requiring significant investment in new and expensive equipment.

While a particular embodiment of the invention has been illustrated and described, various modifications can be made without departing from the spirit and scope of the invention, and all such modifications and equivalents are intended to be covered.

What is claimed is:

1. A hand held automatic transmission fluid changer for connection with a supply and a drain, comprising:

a housing including a flat elongated display panel and a base formed with a well, a raised tower disposed at one end of said panel and raising thereabove to form an end wall at one end of said panel, a hand held rail at the opposite end of said panel and raising above the level of said panel and cooperating with said end wall to form a top panel-receiving compartment;

inlet and outlet flow tubes mounted in said housing and formed with transparent walls disposed in said well for viewing of fluid flowed therethrough, said tubes including respective inlet and outlet couplings disposed exterior of said housing;

a pair of sensors in said tubes for sensing the electrical conductivity of fluid flowing through said tubes and responsive thereto to generate corresponding inlet and outlet conductivity signals;

an electric flow control valve in line with said inlet tube and responsive to a stop signal to close;

a controller in said tower and connected in electrical circuit with said valve and said sensors, said controller being responsive to a predetermined differential between said inlet and outlet conductivity signals to generate said stop signal;

flow meters devices in line with the respective said flow tubes and including display windows mounted on said display panel for viewing thereof; and a hinge connecting said panel to said housing.

2. The apparatus of claim 1, further comprising:

a pump connected with said inlet coupling to said inlet tube and responsive to said shut off signal to shut off.

3. The apparatus of claim 1, further comprising:

first and second flow meters having inlets coupled with the respective outlet couplings of said tubes and electrically coupled to said controller, said meters being responsive to the rate of flowing fluid to generate corresponding flow rate signals;

first and second flow control valves mounted in line with the respective said flow tubes, said valves being electrically coupled to said controller and responsive to control signals to modulate the rate of fluid flowing therethrough; and wherein said controller is responsive to said flow rate signals and includes a comparator for comparing said flow rate signals to generate a corresponding flow rate differential signal for modulating said valves accordingly to maintain substantially equal fluid flow rates through said inlet tube and said outlet tube.

4. The apparatus of claim 2, further comprising:

first and second flow meters electrically coupled to said controller and mounted one each in line with said inlet tube and said outlet tube, respectively, said meters being responsive to the rate of flowing fluid to generate corresponding flow rate signals, and wherein;

said controller is responsive to said flow rate signals and includes a comparator for comparing said flow rate signals to generate a corresponding flow rate differential signal; and said pump is responsive to said flow rate differential signal to modulate the pumping rate accordingly to maintain substantially equal fluid flow rates through said inlet tube and said outlet tube.

5. The apparatus of claim 1, wherein:

said controller includes a microprocessor chip.

6. The apparatus of claim 2, wherein:

said controller is programmable.

7. The apparatus of claim 3, wherein:

said controller includes a screen for displaying numerical values corresponding to said condition signal.

8. An apparatus for replacing used fluid in an automatic transmission having an inlet upstream of the transmission pump and an outlet downstream of said pump, comprising:

a housing;

an inlet flow tube in said housing and including an inlet coupling for connection with a source of supply of unused transmission fluid and an outlet coupling for connection with said transmission inlet;

an electrical conductivity sensor disposed in said inlet flow tube to sense the level of conductivity of said unused transmission fluid to generate a corresponding reference signal indicative of the conductivity of said unused fluid;

an outlet flow tube including an inlet coupling for connection with said outlet from said transmission and an outlet coupling for connection with a drain hose;

an electrical conductivity sensor disposed in said outlet flow tube to sense the level of conductivity of used transmission fluid flowing through said outlet flow tube to generate a corresponding outlet fluid condition signal;

a controller electrically coupled to said sensors and including a comparator for comparing said condition signal with said reference signal and responsive to a predetermined magnitude of difference to generate a shut off signal; and a shut off device in at least one of said flow tubes and responsive to said shut off signal to shut off flow in said at least one of said flow tubes.

9. An apparatus for replacing used fluid in an automatic transmission having an inlet upstream of the transmission pump and an outlet downstream of said pump, comprising:

a housing;

an inlet flow tube in said housing and including an inlet coupling for connection with a source of supply of unused transmission fluid and an outlet coupling for connection with said transmission inlet;

an outlet flow tube including an inlet coupling for connection with said outlet from said transmission and an outlet coupling for connection with a drain hose;

an electrical conductivity sensor disposed in fluid sensing relationship with said outlet flow tube and responsive to a predetermined level of conductivity of said fluid to generate a corresponding condition signal;

a controller electrically coupled to said sensor and responsive to said condition signal to generate a shut off signal; and a shut off device in at least one of said tubes and operative in response to said shut off signal to shut off flow in said one of said tubes.

10. The apparatus of claim 9, further comprising:

an electrical conductivity sensor disposed in said inlet flow tube for and responsive to the condition of fluid flowing therethrough to generate a reference signal, and wherein:

said controller is electrically coupled with both said sensors and includes a comparator responsive to a predetermined differential value between said reference and condition signal to generate a shut off signal; and a sensor for sensing said shut off signal.

11. The apparatus of claim 10, further comprising:

an electric flow control valve coupled in fluid circuit with said inlet tube and connected in electric circuit with said controller and being responsive to said shut off signal to close.

* * * * *